United States Patent
Cheron et al.

(10) Patent No.: US 6,375,252 B1
(45) Date of Patent: Apr. 23, 2002

(54) MOTOR VEHICLE FUNCTIONAL FRONT END REFERENCED TO THE WING OF A VEHICLE

(75) Inventors: Hugues Cheron, Bourg Saint Christophe; Laurent Decker, Boulogne Billancourt; Bruno Ghiringhelli, Langres; Alain Liadouze, Buc; Marc Durbize, Jouars-Pont-de-Chartrain, all of (FR)

(73) Assignees: Compagnie Plastic Omnium, Lyons; Renault SA, Billancourt, both of (FR)

( * ) Notice: Subject to any disclaimer, the term of this patent is extended or adjusted under 35 U.S.C. 154(b) by 0 days.

(21) Appl. No.: 09/711,515

(22) Filed: Nov. 14, 2000

(30) Foreign Application Priority Data

Nov. 15, 1999 (FR) .............................. 9914280

(51) Int. Cl.⁷ .................................................. B60J 7/00
(52) U.S. Cl. .................. 296/203.02; 296/194; 296/186; 296/187
(58) Field of Search ............................. 296/203.2, 194, 296/186, 187

(56) References Cited

U.S. PATENT DOCUMENTS

| 4,573,734 | A | * | 3/1986 | Gass | 296/194 |
| 5,123,695 | A | * | 6/1992 | Kanemitsu et al. | 296/194 |
| 5,533,780 | A | * | 7/1996 | Larson et al. | 296/194 |
| 5,575,526 | A | * | 11/1996 | Wycech | 296/194 |
| 6,186,583 | B1 | * | 2/2001 | Martin | 296/194 |
| 6,205,638 | B1 | * | 3/2001 | Yustick | 29/464 |
| 6,237,990 | B1 | * | 5/2001 | Barbier et al. | 296/203.01 |

FOREIGN PATENT DOCUMENTS

| FR | 2625164 | * | 12/1987 |
| FR | 2 754 235 A1 | | 4/1998 |
| JP | 5-105115 | * | 4/1993 |
| JP | 6-40350 | * | 2/1994 |
| JP | 8-258745 | * | 10/1996 |
| JP | 10-329755 | * | 12/1998 |
| JP | 11-198747 | * | 7/1999 |
| JP | 2000 177633 | * | 6/2000 |

* cited by examiner

*Primary Examiner*—Ken Patel
(74) *Attorney, Agent, or Firm*—Oliff & Berridge, PLC

(57) ABSTRACT

Motor vehicle functional front end particularly comprising an upper crossmember (1).

The said crossmember comprises, near to one of the ends of the said crossmember, a point of reference allowing it to be positioned on the vehicle, longitudinally and laterally, with respect to a reference point provided on a front wing of the vehicle.

19 Claims, 2 Drawing Sheets

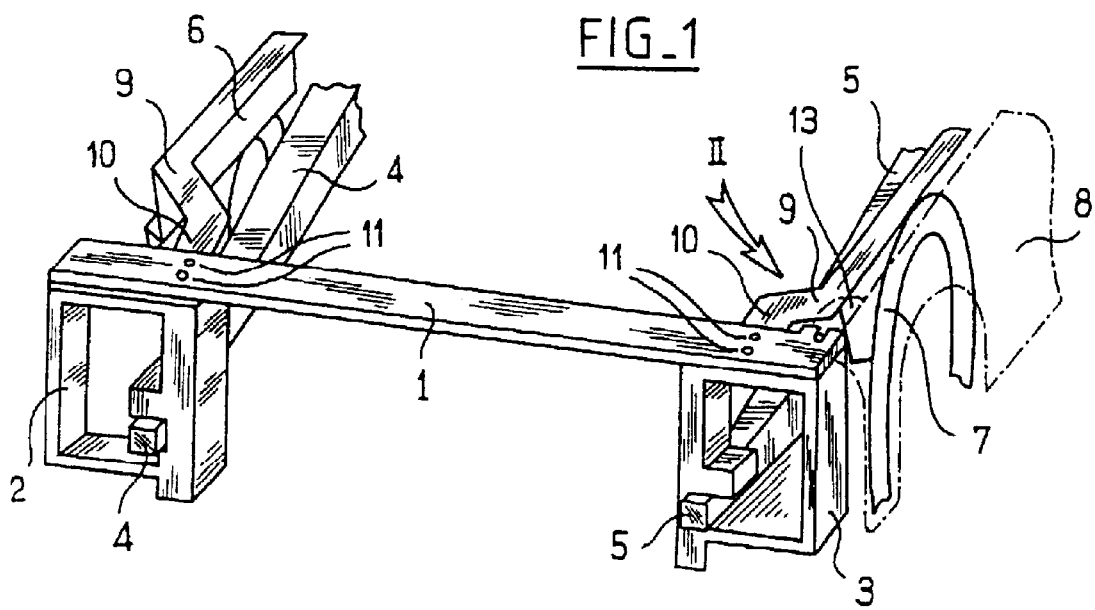
FIG_1
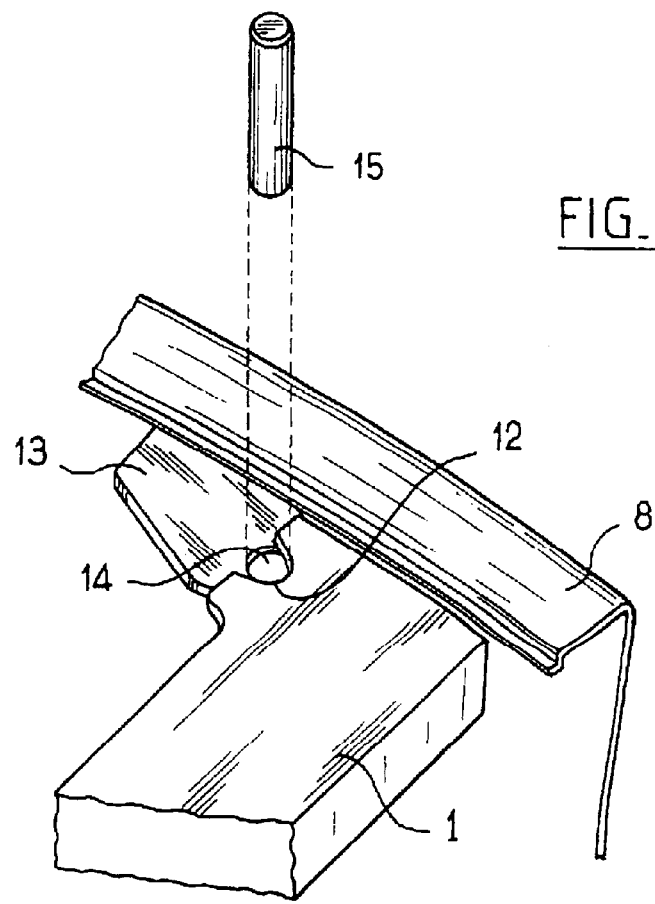
FIG_2

MOTOR VEHICLE FUNCTIONAL FRONT END REFERENCED TO THE WING OF A VEHICLE

BACKGROUND OF THE INVENTION

1. Field of the Invention

The present invention relates to a functional front end of a motor vehicle referenced to the wing (side panel or fender) of the vehicle, wherein the functional front end supports and houses lighting units, as well as possibly other items such as and/or radiators, reservoirs, and electrical and electric units.

2. Description of Related Art

Motor vehicle functional front ends are known in the art as a part of a motor vehicle and are support structures intended mainly to house the radiator of the engine and various items of the vehicle such as the light units, reservoirs and electrical or electronic units.

The benefit of a functional front end is felt particularly when assembling the vehicle because all the items it supports can be fixed to it away from the vehicle assembly line, the assembly then being brought up to the vehicle as a single operation.

A functional front end is fixed to the chassis of the vehicle with a slight offset with respect to the pieces of bodywork.

This offset is of no problem for the technical items but prevents parts which have to coincide very precisely with pieces of bodywork of the vehicle from being fixed to the functional front end.

Nonetheless, to obtain the stylistic effect of modern vehicles which comprise lighting units flush with the pieces of bodywork and aprons or skirts extending the bodywork continuously at the front of the vehicle, it would be desirable to be able to have use of a functional front end which could be positioned very precisely with respect to the body of the vehicle.

The present invention sets out to provide a motor vehicle functional front end which meets this need.

SUMMARY OF THE INVENTION

The subject of the present invention is a motor vehicle functional front end particularly compromising an upper crossmember, characterized in that it comprises, near to one of the ends of the crossmember, a point of reference of the functional front end allowing it to be positioned on the vehicle, longitudinally and laterally, with respect to a reference point of a wing provided on a front wing of the vehicle.

BRIEF DESCRIPTION OF THE DRAWINGS

With a view to making the invention easier to understand, one embodiment thereof which is given by way of nonlimiting example will now be described with reference to the appended drawings, in which:

FIG. 1 is a perspective view of a front part of a motor vehicle,

FIG. 2 is a closeup view in the direction of arrow 2 of FIG. 1.

DETAILED DESCRIPTION OF PREFERRED EMBODIMENTS

Figure 3:
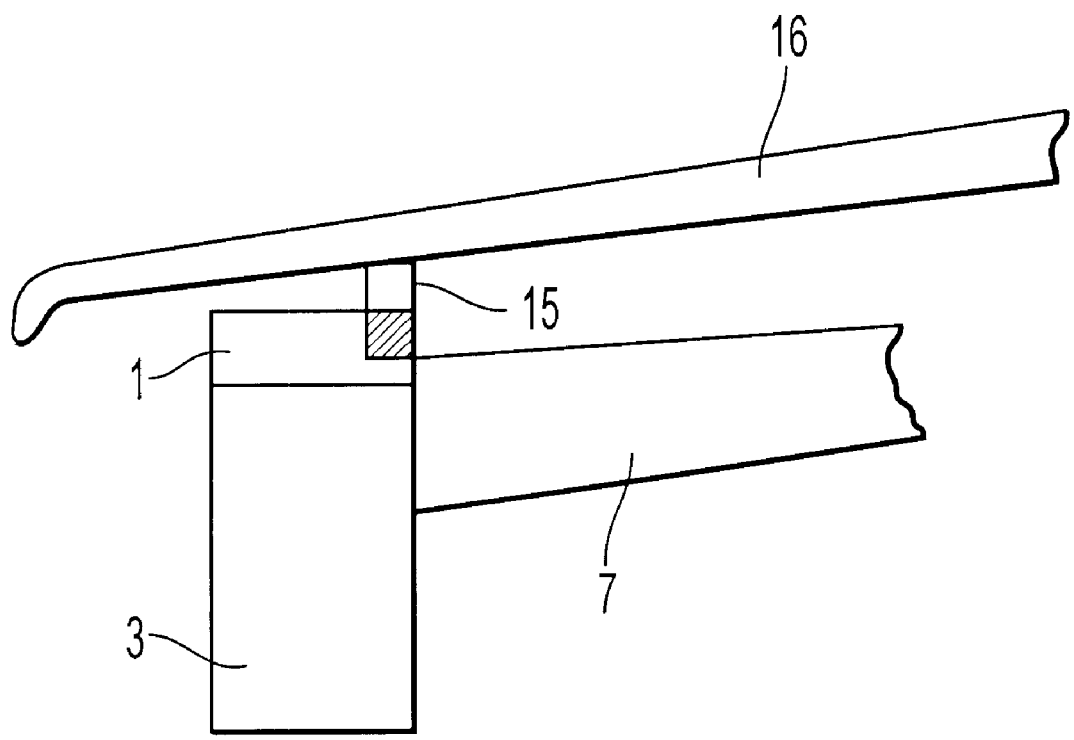
FIG. 3 is a side view of a front part of a motor vehicle in which the hood in a closed position is stopped by a pin.

The functional front end according to the invention is positioned longitudinally and laterally not with respect to the body of the vehicle, namely not with respect to the lower and upper longerons, but with respect to a wing which, at the time that the functional front end is mounted on the vehicle, has already been mounted on the chassis thereof.

The heightwise positioning of the functional front end can be performed by pressure on a wing reinforcement.

It is not until it has been correctly positioned on the vehicle with respect to one of its wings that the functional front end according to the vehicle is fixed to the chassis of the vehicle. In other words, the vertical positioning of the functional front end may be obtained by applying pressure on the reinforcements (9). Once the desired vertical positioning is obtained relative to the position of the one of the wings (8), the functional front end is fixed to the vehicle chassis.

In one particular embodiment of the invention, in order to superpose the point of reference of the functional front end and the reference point of the wing, use is made of a removable means so as to allow the wing to slide with respect to the chassis particularly when this wing is made of plastic and undergoes significant differential expansions.

For example, the point of reference of the functional front end may consist of a notch which rests around a pin planted temporarily in an orifice made in the wing.

The pin constitutes the means of superposition and the orifice made in the wing is the reference point of a wing for the piece of bodywork.

In another embodiment, use is made of a pin fixed into the wing lining, this pin not being removable but once the functional front end has been positioned, serving as a stop for the bonnet. In this case, the pin is equipped at its end directed upwards with an elastic end piece capable of damping the impact that results from the bonnet being slammed shut.

In one particular embodiment of the invention, the upper crossmember comprises holes for fixing to the wing lining of the vehicle, which allows it to be secured to the chassis of the vehicle once it has been positioned by means of the reference point or a wing.

In one particular embodiment of the invention, the crossmember is equipped with a support piece at each of its ends, in the form of a front quadrant, which is a piece capable or incorporating the lighting units of the vehicle and various other items such as a radiators reservoirs, and electrical or electric units generally placed on a functional front end.

In this embodiment, it is advantageous for the point of reference of the functional front end to be on one of the front quadrants.

Thus, not only does the crossmember become simpler to produce, but above all, the front quadrant can be positioned precisely with respect to the wing, something which is very important because it is the front quadrant which supports the items which have to be appropriately positioned with respect to the remainder of the vehicle bodywork, such as the lighting units for example.

Given that just one of the front quadrants may be referenced with respect to the corresponding wing, provision is made, according to the invention, for the overall geometry of the functional front end to be adjusted on a jig before it is mounted on the vehicle, so as to guarantee that the correct positioning of one of the front quadrants with respect to one wing will automatically lead to that of the other front quadrant with respect to the other wing.

To improve the rigidity of the functional front end according to this embodiment, it is advantageous for the support pieces or front quadrants to be fixed at the same time as the crossmember to the wing lining.

In one particular embodiment of the invention, the support pieces provided at each end of the crossmember extend as far as the lower longerons of the vehicle to which they are also secured so that they constitute struts which stiffen the upper crossmember by securing it to the lower longerons.

FIG. 1 depicts a functional front end consisting of an upper crossmember 1 and of two lateral support pieces 2 and 3, two front longerons 4 and 5 of the vehicle, wing linings 6 and 7 and, in chain line, the front left wing 8 of the vehicle.

Each support piece 2, 3 is intended to house a lighting unit and various other items such as a radiator, reservoirs, and electrical or electric units of the vehicle.

Each support piece is in turn firmly secured to the front end of a longeron 4, 5.

At the upper part of the functional front end, the crossmember is firmly secured to a wing lining reinforcement 9 which is shaped in such a way that its front end 10 positions itself under the crossmember 1.

The crossmember is fixed to the reinforcement 9 by screwing through orifices 11.

According to the invention, the fixings which have just been described for fixing the functional front end to the vehicle are not used until after the functional front end has been precisely positioned with respect to a piece of bodywork, in this particular instance the front left wing 8 of the vehicle.

For this purpose, the crossmember 1 at its left-hand end comprises a point of reference of a functional front end as a notch 12 which is open towards the inside of the vehicle.

For its part, the wing 8 comprises a plate 13 protruding towards the inside of the engine compartment and equipped with a reference point of a wing comprising an orifice 14 which is capable of accommodating a removeable pin 15, as can be seen in FIG. 2 in which only the crossmember, the pin and the wing have been depicted.

The removable pin 15 engaged in the reference point of a wing comprising an orifice 14 in the wing acts as a reference point for the point of reference of the functional front end.

The latter is positioned on the vehicle by bringing the point of reference of a functional front end comprising a notch 12 of the crossmember opposite the pin 15, which positions it longitudinally with respect to the vehicle.

Vertical positioning is obtained by pressure on the two reinforcements 9.

Once the functional front end has been suitably positioned, the aforementioned fixings to the reinforcements 9 and to the longerons 4 and 5 are inserted.

The pin 15 can then be removed.

The functional front end according to the invention, which is very precisely referenced with respect to the wing of the vehicle, can support lighting units and an apron which require exact positioning with respect to the other pieces of vehicle bodywork.

It must be clearly understood that the embodiment which has just been described is not in any way limiting and that it can be modified in any desirable way without thereby departing from the scope of the invention.

What is claimed is:

1. Motor vehicle functional front end particularly comprising an upper crossmember (1), characterized in that it comprises, near to one of the ends of the said crossmember, a point of reference of the functional front end (12) allowing it to be positioned on the vehicle, longitudinally and laterally, with respect to a reference point of a wing (14) provided on a front wing of the vehicle.

2. Functional front end according to claim 1, characterized in that the point of reference of the functional front end (12) on the functional front end and the reference point (14) on the wing are superposed using a removable means (15).

3. Functional front end according to claim 2, wherein the point of reference of the functional front end (12) consists of a notch which rests around a pin (15) planted temporarily in the reference point of a wing (14) comprising an orifice made in the wing.

4. Motor vehicle functional front end particularly comprising an upper crossmember (1), characterized in that it comprises, near to one of the ends of the said crossmember, a point of reference of the functional front end (12) allowing it to be positioned on the vehicle, longitudinally and laterally, with respect to a reference point of a wing (14) provided on a front wing of the vehicle, wherein the point of reference of the functional front end (12) and the reference point of the wing (14) are superposed using a pin fixed into the wing lining and which, once the functional front end is in position, serves as a stop for a bonnet.

5. Functional front end according to claim 1, characterized in that the upper crossmember (1) comprises holes (11) for fixing to the wing linings (6, 7) of the vehicle.

6. Functional front end according to claim 1, wherein the upper crossmember (1) is equipped, at each of its ends, with a support piece (2, 3).

7. Functional front end according to claim 6, wherein the point of reference of the functional front end is on one of the supports.

8. Functional front end according to claim 6, wherein the support pieces (2, 3) are fixed at the same time the upper crossmember (1) is fixed to the wing linings (6, 7).

9. Functional front end according to claim 6, characterized in that the support pieces (2, 3) provided at each end of the crossmember extend as far as the lower longerons (4, 5) of the vehicle to which they are also secured.

10. Functional front end according to claim 2, characterized in that the upper crossmember (1) comprises holes (11) for fixing to the wing linings (6,7) of the vehicle.

11. Functional front end according to claim 3, characterized in that the upper crossmember (1) comprises holes (11) for fixing to the wing linings (6,7) of the vehicle.

12. Functional front end according to claim 4, characterized in that the upper crossmember (1) comprises holes (11) for fixing to the wing linings (6,7) of the vehicle.

13. Functional front end according to claim 2, wherein the upper crossmember (1) is equipped, at each of its ends, with a support piece (2, 3).

14. Functional front end according to claim 3, wherein the upper crossmember (1) is equipped, at each of its ends, with a support piece (2, 3).

15. Functional front end according to claim 4, wherein the upper crossmember (1) is equipped, at each of its ends, with a support piece (2, 3).

16. Functional front end according to claim 5, wherein the upper crossmember (1) is equipped, at each of its ends, with a support piece (2, 3).

17. Functional front end according to claim 7, wherein the support pieces (2, 3) are fixed at the same time the upper crossmember (1) is fixed to the wing linings (6, 7).

18. Functional front end according to claim 7, characterized in that the support pieces (2, 3) provided at each end of the crossmember extend as far as the lower longerons (4, 5) of the vehicle to which they are also secured.

19. Functional front end according to claim 8, characterized in that the support pieces (2, 3) provided at each end of the crossmember extend as far as the lower longerons (4, 5) of the vehicle to which they are also secured.

* * * * *

UNITED STATES PATENT AND TRADEMARK OFFICE
CERTIFICATE OF CORRECTION

PATENT NO.   : 6,375,252 B1
DATED        : April 23, 2002
INVENTOR(S)  : Hugues Cheron, Laurent Decker, Bruno Ghiringhelli, Alain Liadouze and Marc Durbize It is certified that error appears in the above-identified patent and that said Letters Patent is hereby corrected as shown below:

<u>Title page,</u>
Item [73], the city of the assignee, "Compagnie Plastic Omnium," should be
-- Lyon --.

Signed and Sealed this

Twenty-second Day of October, 2002

*Attest:*

*Attesting Officer*

JAMES E. ROGAN
*Director of the United States Patent and Trademark Office*